United States Patent [19]

Hagersten et al.

[11] Patent Number: 5,903,907
[45] Date of Patent: May 11, 1999

[54] SKIP-LEVEL WRITE-THROUGH IN A MULTI-LEVEL MEMORY OF A COMPUTER SYSTEM

[75] Inventors: Erik E. Hagersten, Palo Alto; Mark D. Hill, Los Altos, both of Calif.

[73] Assignee: Sun Microsystems, Inc., Mountain View, Calif.

[21] Appl. No.: 08/674,560

[22] Filed: Jul. 1, 1996

[51] Int. Cl.[6] .................................................. G06F 12/08
[52] U.S. Cl. ...................... 711/122; 711/142; 711/143; 711/144; 711/145; 711/133; 711/136
[58] Field of Search .................... 711/122, 142, 711/143, 144, 145, 133, 136

[56] References Cited

U.S. PATENT DOCUMENTS

5,524,235  6/1996  Larson et al. ............................ 711/151
5,581,727  12/1996  Collins et al. ........................... 711/135

FOREIGN PATENT DOCUMENTS

0 681 241 A1  5/1995  European Pat. Off. .

OTHER PUBLICATIONS

John L. Hennessy and David A. Patterson, "Computer Architecture: A Quantitative Approach," Morgan Kaufmann Publishers, Inc., 1990, pp. 408–425 and 460–465.

Norman P. Jouppi and Steven J.E. Wilton, "Tradeoff in Two–Levels On–Chip Caching," digital Western Research Laboratory, WRL Research Report Mar. 1993, 33 pages.

Joe T., et al., "Evaluating the Memory Overhead Required for COMA Architectures", Proceedings of the Annual International Symposium on Computer Architecture, Chicago, Apr. 18–21, 1994, No. Symp. 21, Apr. 18, 1994, Institute of Electrical and Electronics Engineers, pp. 82–93, XP000480427 *p. 90, right–hand column, line 22—page 91, left–hand column, line 4.

Anonymous: "Second Level Cache for MP Systems", IBM Technical Disclosure Bulletin, vol. 27, No. 1A, Jun. 1984, New York, US.

Mekhiel, Nagi N. et al. "Performance Analysis For A Two Level Cache System"; Conference Record on the Twenty–Sixth Asilomar Conference on Signals, Systems and Computers, IEEE Comput. Soc. Press 1992; vol. 1, pp. 71–77, Dec. 1992.

Handy, Jim "The Cache Memory Book", Academic Press 1993; pp. 159–161, Dec. 1993.

Pentium Processor User's Manual vol. 1: Pentium Processor Data Book; Intel Corp. 1994; pp. 3–13 to 3–15, Dec. 1994.

Pentium Processor User's Manual vol. 2: 82496 Cache Controller and 82491 Cache SRAM Data Book; Intel Corp. 1994; pp. 3–1 to 3–7, 3–12 to 3–13, 5–8, Dec. 1994.

*Primary Examiner*—Reginald G. Bragdon
*Attorney, Agent, or Firm*—Conley, Rose & Tayon, PC; B. Noel Kivlin

[57] ABSTRACT

A flexible scheme is provided for designating the appropriate write-back protocol best suited for each memory level within a multi-level-cache computer system. The skip-level memory hierarchy of the present invention includes a lower-level copy-back cache and a higher-level write-through cache. This greatly simplifies the implementation of the higher-level cache, since it may be implemented with a write-or-read access to its address tag. Although counterintuitive, a write-through higher-level cache in a distributed shared memory may also increase the efficiency of the computer system without unduly increasing the volume of network traffic within the computer system. This is because a write-through higher-level cache increases the probability of readily-available cached copies of updated data which are consistent with the home copies of the data, thereby reducing the number of fetches from remote home locations whenever the data is not found in the lower-level cache but is found in the higher-level cache.

15 Claims, 9 Drawing Sheets

SKIP-LEVEL WRITE-THROUGH IN A MULTI-LEVEL MEMORY OF A COMPUTER SYSTEM

INCORPORATION BY REFERENCE

This patent application is related to the following commonly assigned patents, the disclosures of which are incorporated herein by reference in their entirety:

1. U.S. Pat. No. 5,802,563 entitled "Efficient Storage of Data in Computer System with Multiple Cache Levels" by Hagersten et al. issued Sep. 1, 1998; and
2. U.S. Pat. No. 5,734,922 entitled "A Multiprocessing System Configured to Detect and Efficiently Provide for Migratory Data Access Patterns" by Hagersten et al., issued Mar. 31, 1998.

BACKGROUND OF THE INVENTION

1. Field of the Invention

This invention relates to computer system memories. In particular, this invention relates to a write-through operation involving a lower-level memory and a higher-level memory which skips at least one intermediate-level of memory in a computer system.

2. Description of the Related Art

In a typical multi-level-cache multi-node computer system having first-level caches (L1$s), second-level caches (L2$s) and a third level caches (L3$s), within each node, inclusion is maintained between the L1$s and the L2$s, but inclusion is not required between the L2$s and the L3$s. In other words, data that resides in a L1$ also resides in a respective L2$. However, data residing in the L1$ or L2$ do not necessarily have to reside in a respective L3$.

The L2$s are generally designated as copy-back caches because as second level caches, the L2$s can generate too much network traffic operating as write-through caches. Intuitively, the L3$s should also be designated as copy-back caches because the L3$s are higher level and larger than both the L2$s and the L1$s.

When data is first accessed by a requesting processor, the data is fetched from its home location and automatically cached in the respective L1$ and L2$. Subsequently, if the requesting processor writes/modifies the data, copies of the data in both the L1$ and L2$ are updated, i.e., write through is performed between the L1$ and the L2$.

However, since the L2$ is a copyback cache, changes in the L2$ are not immediately reflected in the home location of the data nor in the L3$, regardless of whether a copy of the data also exist in the L3$. A subsequent writeback transaction is used to update the data to its home location when dirty data in the L2$ needs replacement. Similarly, since the L3$ associated with requesting processor is also a copy-back cache, no immediate write back is initiated between the L3$ and the data's home location.

The perceived efficiency of the above described scheme is based on the assumption that any advantage gained by enforcing write-through protocol for either the L2$ and/or L3$ is far outweighed by a drastic increase in network traffic. However, the complexity of implementing a copy-back L3$ and the fact that a copy-back L2$ will already avoid most of the extra traffic in the network begs for simpler and more efficient solutions.

Hence, there is a need for a flexible scheme to efficiently designate memory write-back protocols for the multiple levels of memories within a computer system. Such a scheme should accomplish data coherency within the computer system without imposing an undue burden on the underlying network of the computer system.

SUMMARY OF THE INVENTION

The present invention provides a flexible scheme which designates the appropriate write-back protocol best suited for each memory level within a computer system.

The skip-level memory hierarchy of the present invention includes a lower-level copy-back cache and a higher-level write-through cache. This greatly simplifies the implementation of the higher-level cache, since it may be implemented with a write-or-read access to its address tag.

Although counterintuitive, a write-through higher-level cache in a distributed shared memory may also increase the efficiency of the computer system without unduly increasing the volume of network traffic within the computer system. This is because a write-through higher-level cache increases the probability of readily-available cached copies of updated data which are consistent with the home copies of the data, thereby reducing the number of fetches from remote home locations whenever the data is not found in the lower-level cache but is found in the higher-level cache.

In one embodiment as implemented in a multi-level hybrid cache-only memory architecture/non-uniform memory architecture (COMA/NUMA) computer system, the designating scheme involves a three level memory hierarchy; a first level cache (L1$), a second level cache (L2$) and a third level cache (L3$), with the L2$ and L3$ functioning as the lower-level copy-back cache and higher-level write-through caches, respectively. Note however that the lower-level copy-back cache and higher-level write-through cache combination of the present invention can also be implemented in other cache architectures with at least two levels of caches, such as a NUMA-only architecture.

In one aspect of the invention, when a cached copy of data is modified in the lower-level cache, the copy is simply marked "dirty". No immediate attempt is made to write-back the dirty data to its home location. Subsequently, the dirty data is written back to the home location when the dirty data is replaced, e.g., when the space occupied by the "dirty" data needs to be freed up to make space for writing new data to the lower-level cache.

In another aspect of the invention, when the dirty data is eventually written back to the home location, if a copy of the data exist in the write-through higher-level cache, the higher-level cached copy is either updated or invalidated. As a result, coherency of data between the higher-level cache and the home location is maintained. Such an arrangement permits cached copies of data in the higher-level cache to be simply discarded when its copies are displaced.

DESCRIPTION OF THE DRAWINGS

The objects, features and advantages of the system of the present invention will be apparent from the following description in which.

DESCRIPTION OF THE PREFERRED EMBODIMENT

In the following description, numerous details provide a thorough understanding of the invention. These details include functional blocks and an exemplary cache architecture to aid implementation of a skip-level scheme for designating the appropriate memory write-back protocols within a computer system. In addition, while the present invention is described with reference to a specific designation scheme involving a multi-level hybrid cache-only memory architecture/non-uniform memory architecture (COMA/NUMA) for a computer system, the invention is applicable to a wide range of cache and system architectures, including but not limited to a COMA-only or a NUMA-only architecture. In other instances, well-known circuits and structures are not described in detail so as not to obscure the invention unnecessarily.

The above-identified pending applications disclose a hybrid cache-only memory architecture/non-uniform memory architecture (COMA/NUMA) having a shared global memory address space and a coherent caching system for a networked computing system, which provides a suitable exemplary hardware environment for implementing the present invention.

Figure 1A:
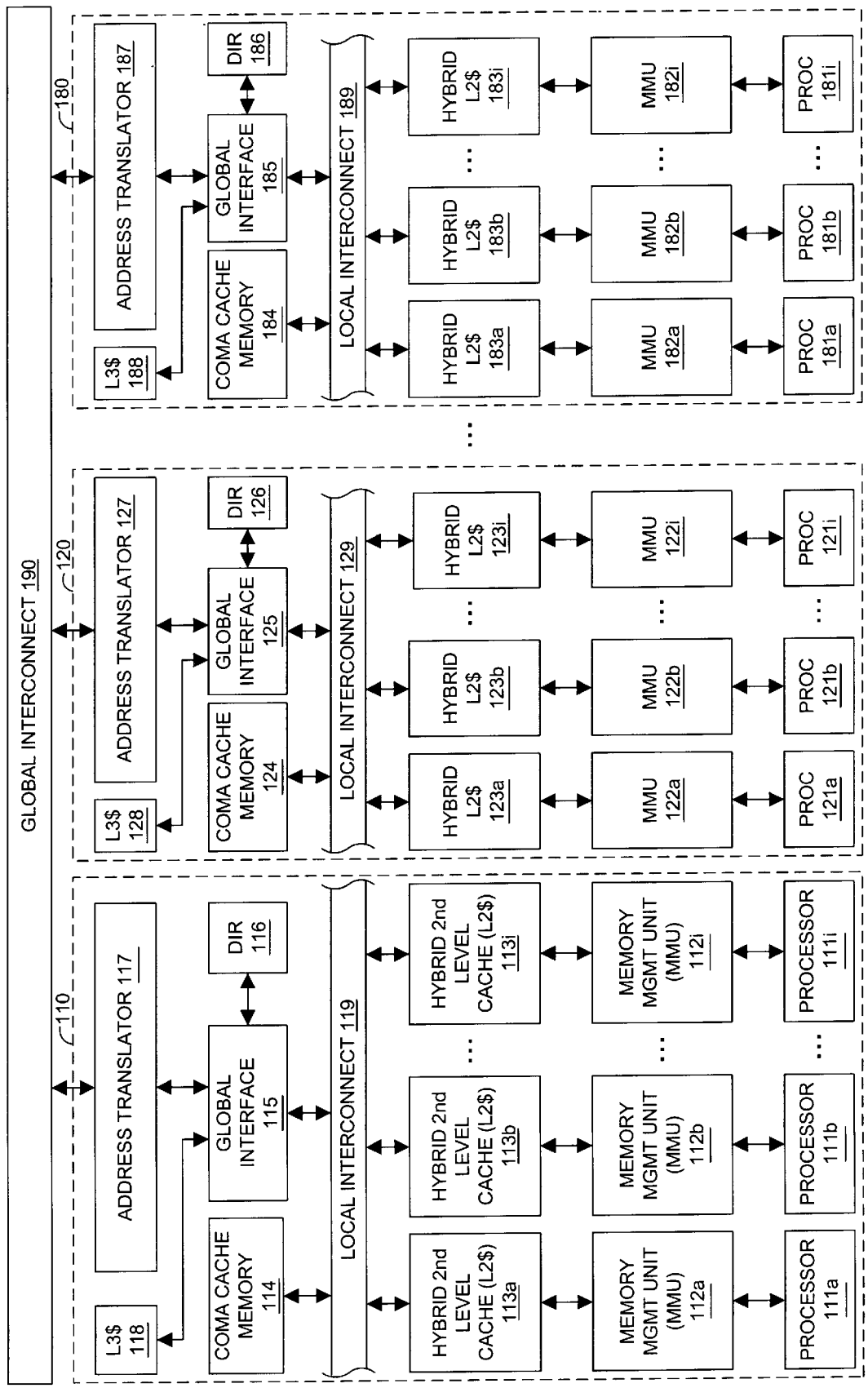
FIG. 1A is a block diagram showing a networked computer system with a hybrid cache-only memory architecture/non-uniform memory architecture (COMA/NUMA) which provides a suitable hardware environment for implementing the present invention.

FIG. 1A is a block diagram showing one such hybrid COMA/NUMA computer system 100. System 100 includes a plurality of sub-systems 110, 120, . . . 180, coupled to each other via a global interconnect 190. Each sub-system (node) is assigned a unique network node address. Each sub-system includes one or more processors, a corresponding number of memory management units (MMUs) and hybrid second level caches (L2$s), a COMA node memory assigned with a portion of a global memory address space, a third-level cache (L3$), a global interface and a local interconnect. For example, sub-system 110 includes processors 111a, 111b . . . 111i, MMUs 112a, 112b, . . . 112i, L2$s 113a, 113b, . . . 113i, node memory 114, global interface 115, L3$ 118 and local interconnect 119.

In order to support a directory-based cache coherency scheme, sub-systems 110, 120, . . . 180 also include directories 116, 126, . . . 186 coupled to global interfaces 115, 125, . . . 185, respectively. Data originating from, i.e., whose "home" location is, anyone of node memories 114, 124, . . . 184 may be duplicated in attraction memory (AM) of system 100. For example, in COMA mode, data whose "home" is in node memory 114 of sub-system 110 may be duplicated in one or more of the cache memories 124, . . . 184 and may also be duplicated in one or more of L2$s 113a . . . 113i, 123a . . . 123i, and 183a . . . 183i. Accordingly, cache memories 124 . . . 184 and L2$s 113a . . . 113i, 123a . . . 123i, and 183a . . . 183i may serve as attraction memory in COMA mode. Alternatively, in NUMA mode, data whose "home" is in node memory 114 of sub-system 110 may be duplicated in one or more of L2$s 113a . . . 113i, 123a . . . 123i, and 183a . . . 183i, and possibly in L3$ 118. Accordingly, L2$s 113a . . . 113i, 123a . . . 123i, and 183a . . . 183i may serve as attraction memory in NUMA mode, as well as L3$ 118.

Home directory 126 is responsible for maintaining a master record of existing copies of the home page throughout system 100. In addition, MTAGs associated with the home directory and the directory of any node with an allocated AM page, e.g., directories 116 and 186, track the status of the local copies in each requesting subsystem using one of four exemplary states. An invalid ("I") state indicates that a particular subsystem does not have a (cached) copy of a data line of interest. A shared ("S") state indicates that the subsystem, and possibly other subsystems, have a shared (cached) copy of the data line of interest. An owned ("O") state indicates that the subsystem, and possibly other subsystems, have a (cached) copy of the data line of interest. The subsystem with the O copy is required to perform a write-back upon replacement. A modified ("M") state indicates that the subsystem has the only (cached) copy of the data line of interest, i.e., the subsystem is the sole owner of the data line and there are no S copies in the other subsystems.

In this implementation, as shown in FIG. 1A, COMA memories 114, 124, . . . 184 are separate from L3$s 118, 128, . . . 188, and each of processors 111a, 111b, . . . 111i, 121a, 121b, . . . 121i, and 181a, 181b, . . . 181i includes an internal first level cache (L1$) (not shown in FIG. 1A). Accordingly, the cache memory hierarchy of system 100 includes L1$s, L2$s, L3$s and separate COMA caches.

When system 100 is caching data in COMA mode, inclusion is maintained between the L1$s and the L2$s, and between the L2$s and COMA caches. In other words, data that resides in a L1$ also resides in a respective L2$, and data residing in the L1$ or L2$ do reside in a respective COMA cache as well. Accordingly, the L3$ is unused in COMA mode.

Conversely, when caching data in NUMA mode, COMA cache 114 is unused. Hence, in NUMA mode, the hybrid NUMA/COMA architecture can therefore be said to have no inclusion between the L2$ and COMA caches, since data in the L2$ 112a will only reside in cache 114 if the page is accessed in COMA mode, and not reside in the COMA cache 114 if the page is accessed in NUMA mode, i.e., data residing in the L2$ will not necessarily reside in the COMA cache 114.

Thus, a NUMA architecture, or a hybrid NUMA/COMA architecture, optionally includes the separate L3$ 118 coupled to global interface 115, as shown in FIG. 1A. In a NUMA architecture, L3$ 118 would hold data originating from remote nodes, and may thus avoid unnecessary remote accesses. Thus, in the hybrid NUMA/COMA example, L3$ 118 would only hold data of pages accessed in NUMA mode, i.e., and will similarly avoid remote accesses for that data. In the remainder of this description, the term L3$ will refer to such a NUMA-only, or hybride NUMA/COMA cache, and not the COMA memory 114 for COMA mode accesses.

Figure 1B:
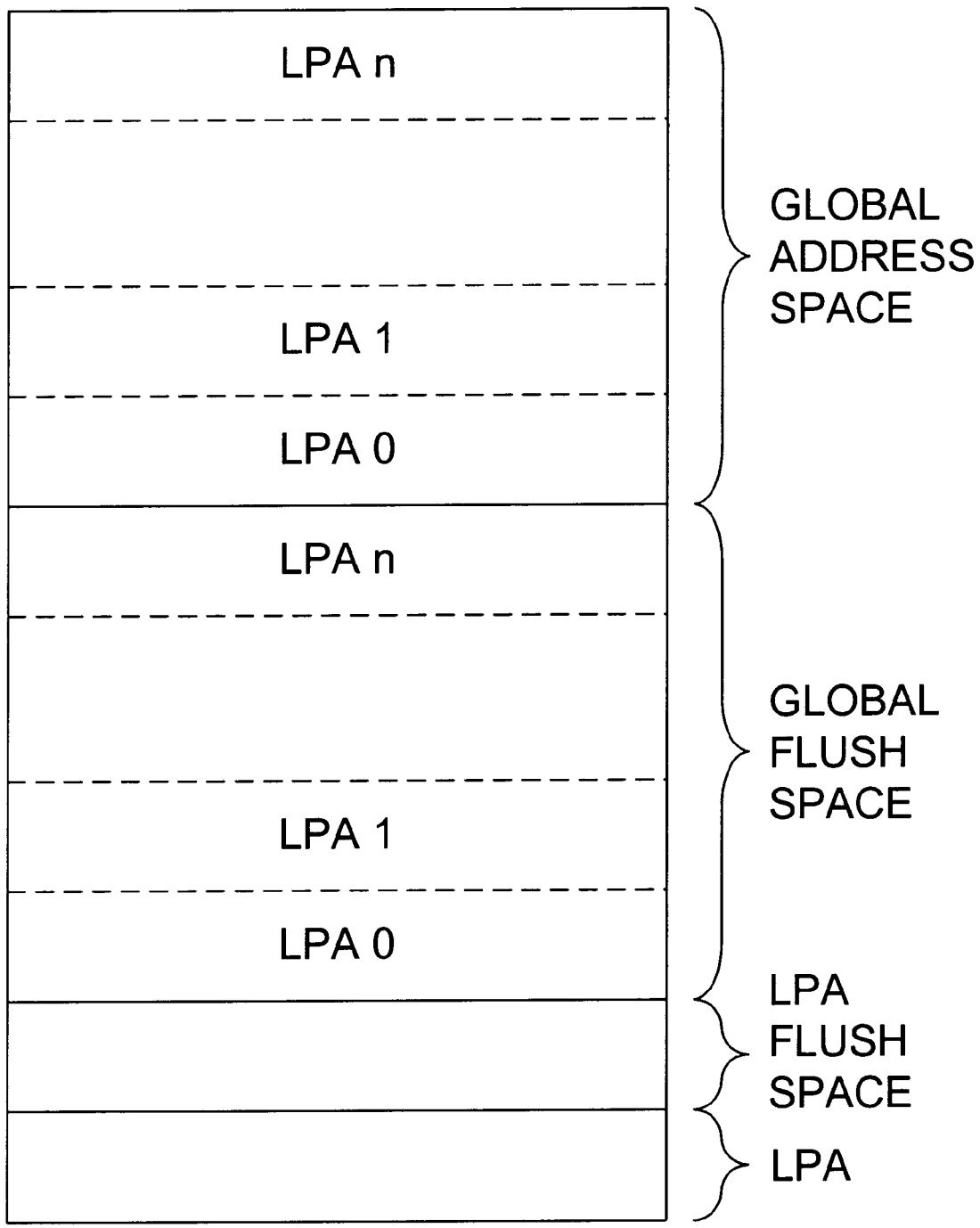
FIG. 1B is an exemplary memory map for the computer system of FIG. 1A.

FIG. 1B is an exemplary memory map for the computer system shown in FIG. 1A. As shown in FIG. 1B, the memory map includes a global address space, a global flush space, an LPA flush space, and an LPA space.

In accordance with this embodiment of the present invention, L2$s and L3$s are the lower and higher level caches, respectively. FIGS. 2, 3A–3C and 4A–4C are flowcharts depicting this embodiment of the skip-level memory designation scheme as implemented on exemplary COMA/NUMA computer system 100. In this example, the requesting subsystem is subsystem 110 while the home subsystem is subsystem 120.

Figure 2:
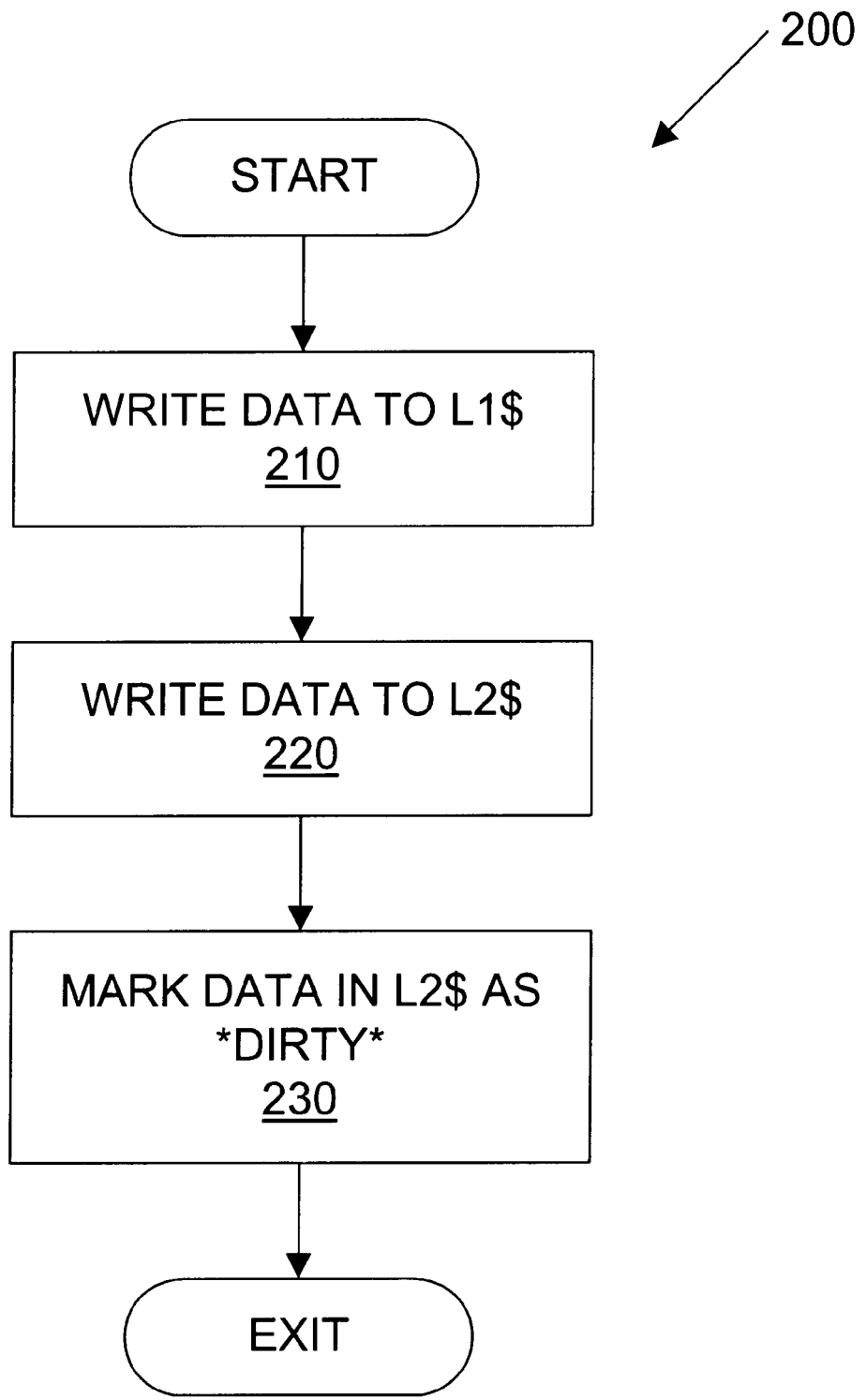
FIG. 2 is a flowchart depicting a write/modify of data in a copy-back cache.

Referring now to the flowchart of FIG. 2, since L2$ 113a is a copy-back cache, whenever an L2$ copy of data is being updated, the new value of the data is written to L2$ 113a and the L2$ (modified) copy of the data is marked "dirty". No immediate attempt is made to update outdated copies of the data in higher level caches, e.g., in the L3$ 118 nor the home location of the data. Instead, writebacks of dirty data to the respective home subsystem(s) are executed later, e.g., during replacement of dirty data.

Figure 3A:
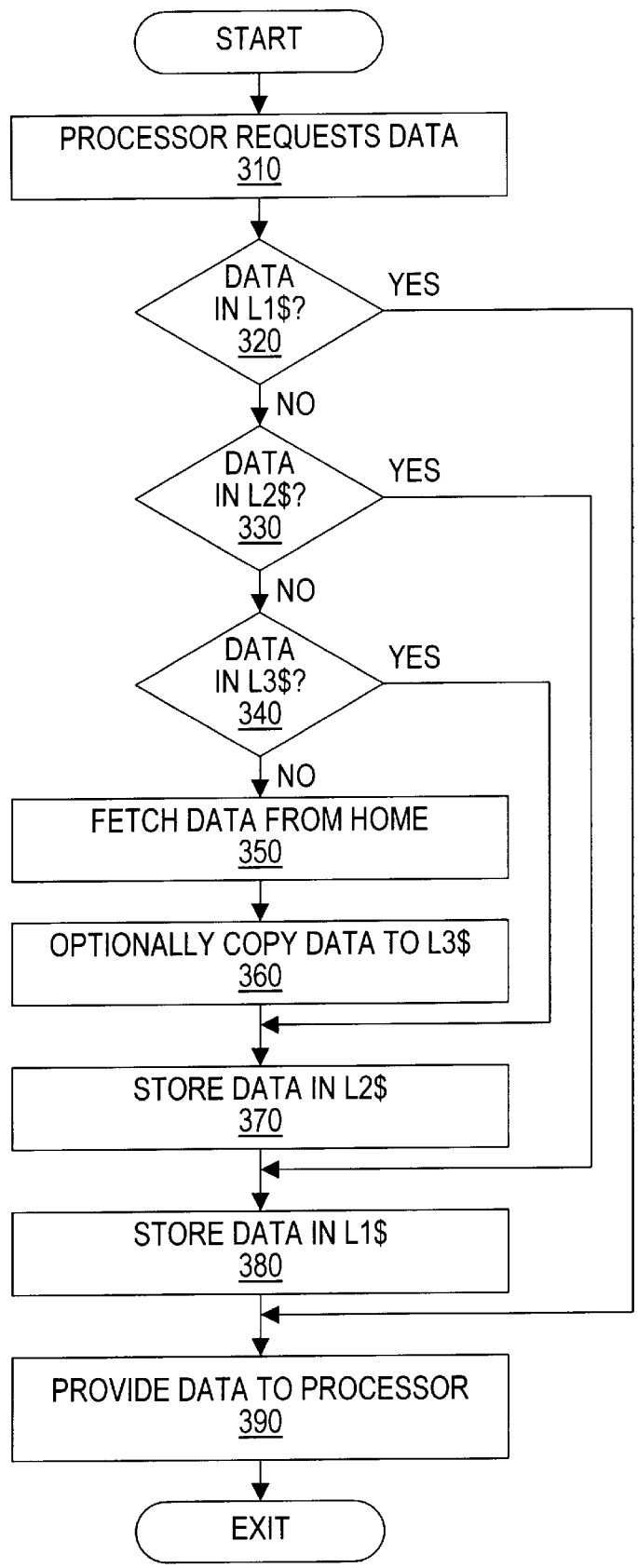
FIG. 3A–3C are flowcharts depicting how data is requested by, cached and provided to a processor in a multi-level cache of the computer system of FIG. 1A.

Accordingly, as shown in the flowchart of FIG. 3A, when processor 111a of requesting subsystem 110 requests the data (step 310) and a cached copy is found in its internal L1$ (step 320), the data is provided to processor 111a (step 390).

If the data is not cached in the internal L1$ of processor 111a (step 320), but a cached copy is found in L2$ 112a (step 330), the data is provided to processor 111a and cached in its internal L1$ (step 390). Note that the data can first be provided to an execution unit of processor 111a and then cached in its L1$, or vice versa.

Alternatively, if the data is not found in either L1$ or L2$ 113a (steps 320 and 330), but a cached copy is located in L3$ 118, then the data is provided to processor 111a and cached in L2$ 112a and the internal L1$ of processor 111a (steps 370, 380 and 390).

Finally, if the data is not found in either L1$, L2$ or L3$ (steps 320, 330 and 340), then a request for the data is sent to the data's home subsystem 120 (step 350). Upon receipt of a copy of the data, requesting subsystem 110 can optionally cache the data in L3$ 118 (step 360), i.e., there is not necessarily any inclusion between the L2$ and the L3$. The data is provided to requesting processor 111a, and cached in L2$ 113a and the internal L1$ of processor 111a (step 370, 380 and 390).

Figure 3B:
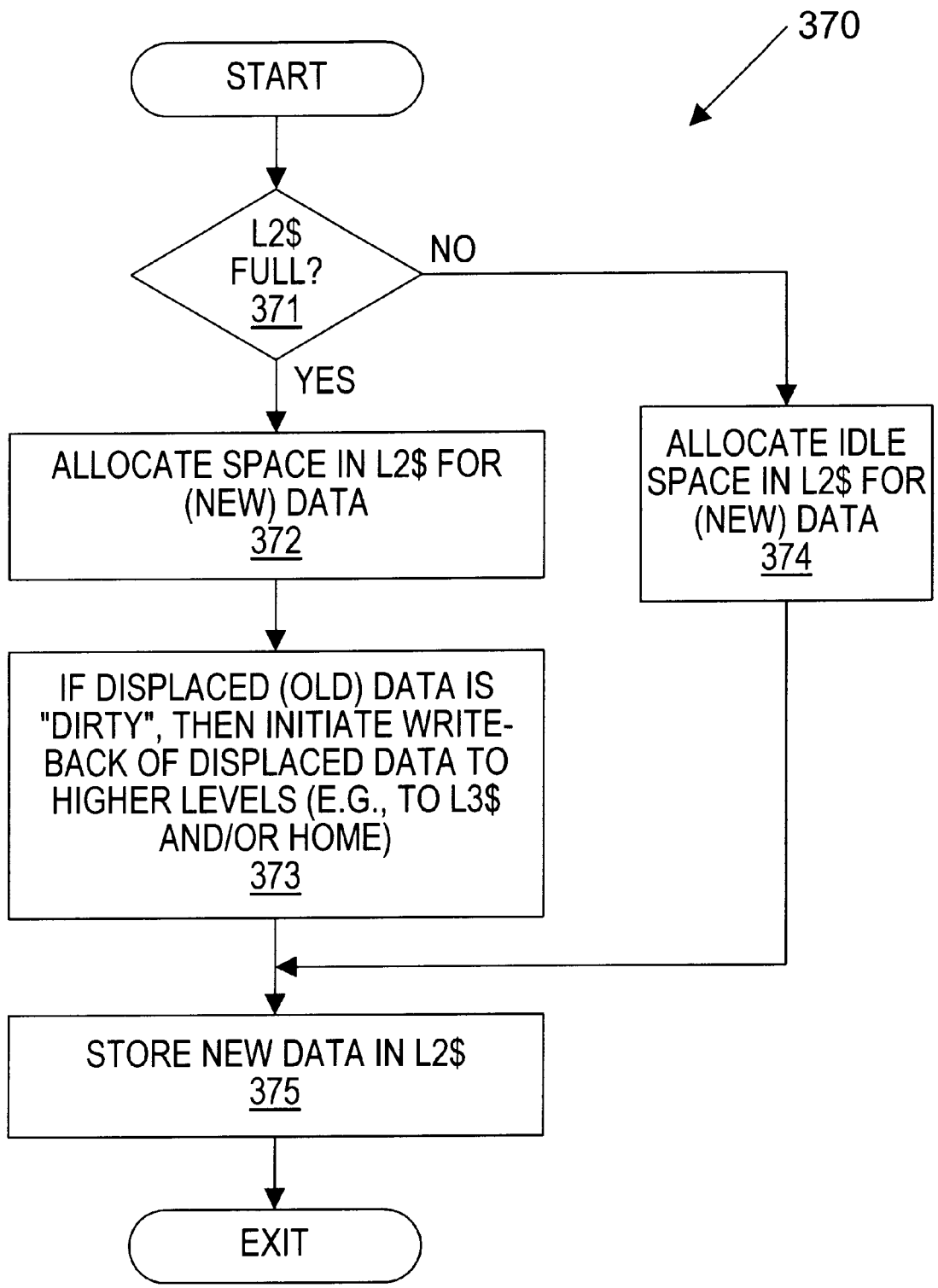

Referring now to FIG. 3B which is a flowchart depicting one aspect of the invention, L2$ 113a, the lower-level cache, is a copy-back cache as discussed above. Accordingly, when any dirty data in L2$ 113a needs replacement, e.g., when the dirty data is displaced by new data in L2$ 112a (step 372), requesting subsystem 110 initiates a writeback to the home subsystem of the dirty data, e.g., to home subsystem 120 (step 373). In addition, if an outdated, i.e., superseded, copy of the data exists in L3$ 118, the outdated copy of the data in L3$ 118 is updated with the dirty copy from L2$ 112a (step 373). The L3$ may also optionally be updated with a copy of the data even if L3$ 118 did not contain the data prior to the writeback. Note that since the home memory is always updated, any copy of the data in L3$ 118 will be "clean".

Figure 3C:
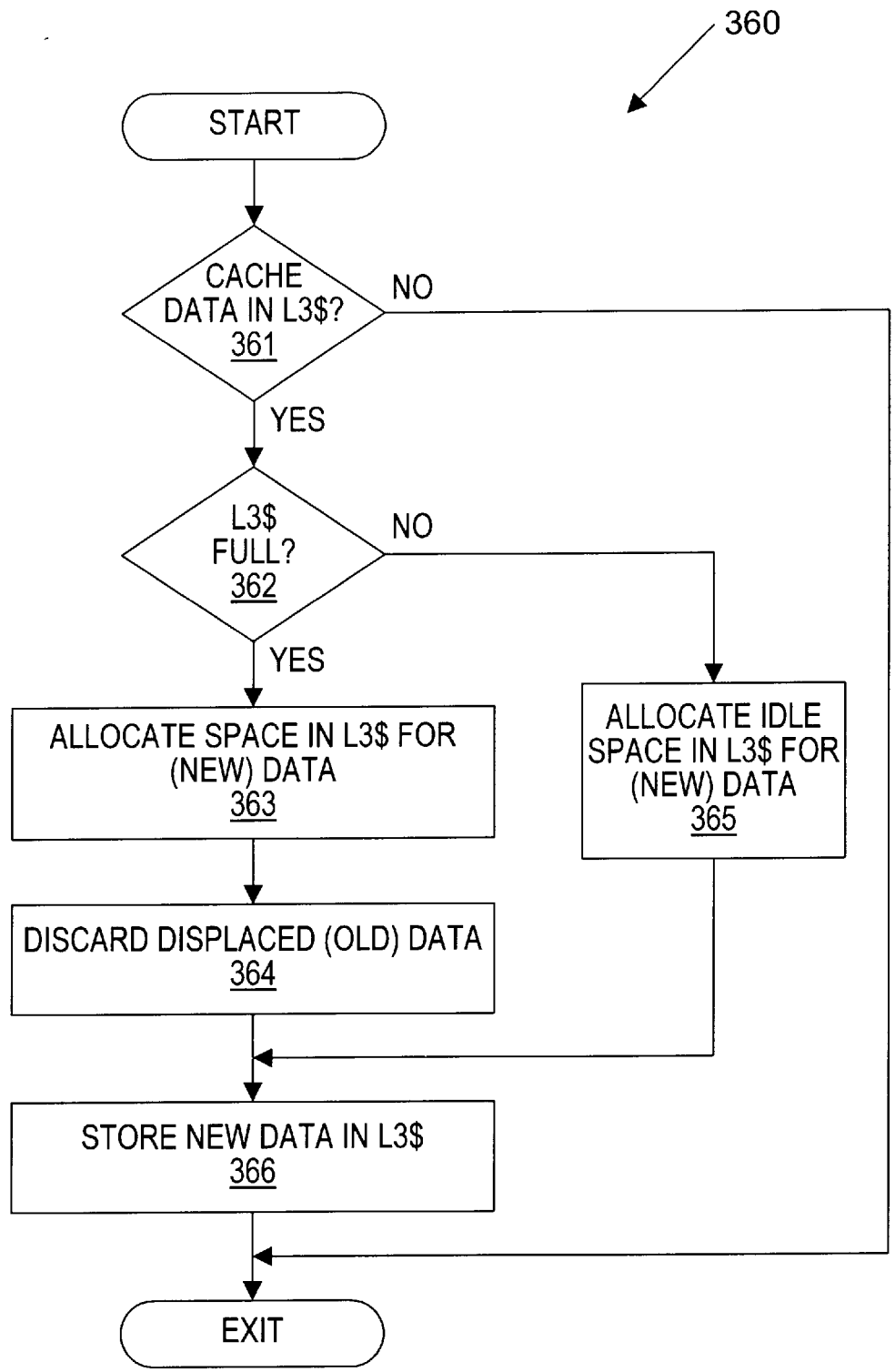

In accordance to another aspect of the invention, as illustrated by the flowchart of FIG. 3C, although counter-intuitive in view of copyback L2$ 112a, L3$ 118, the higher-level cache, is a write-through cache. As such, any copy of data cached in L3$ 118 cannot be dirty and should be consistent with the data in home subsystem 120. This is accomplished by continually writing back, i.e., updating, the data in home subsystem 120 from any changed copy in L3$ 118. For example, when older data is displaced from L3$ 118 to free up space for newer data (step 363), the older data is simply discarded (step 364). This greatly simplifies the logic for cache replacement in L3$ 118.

Figure 4A:
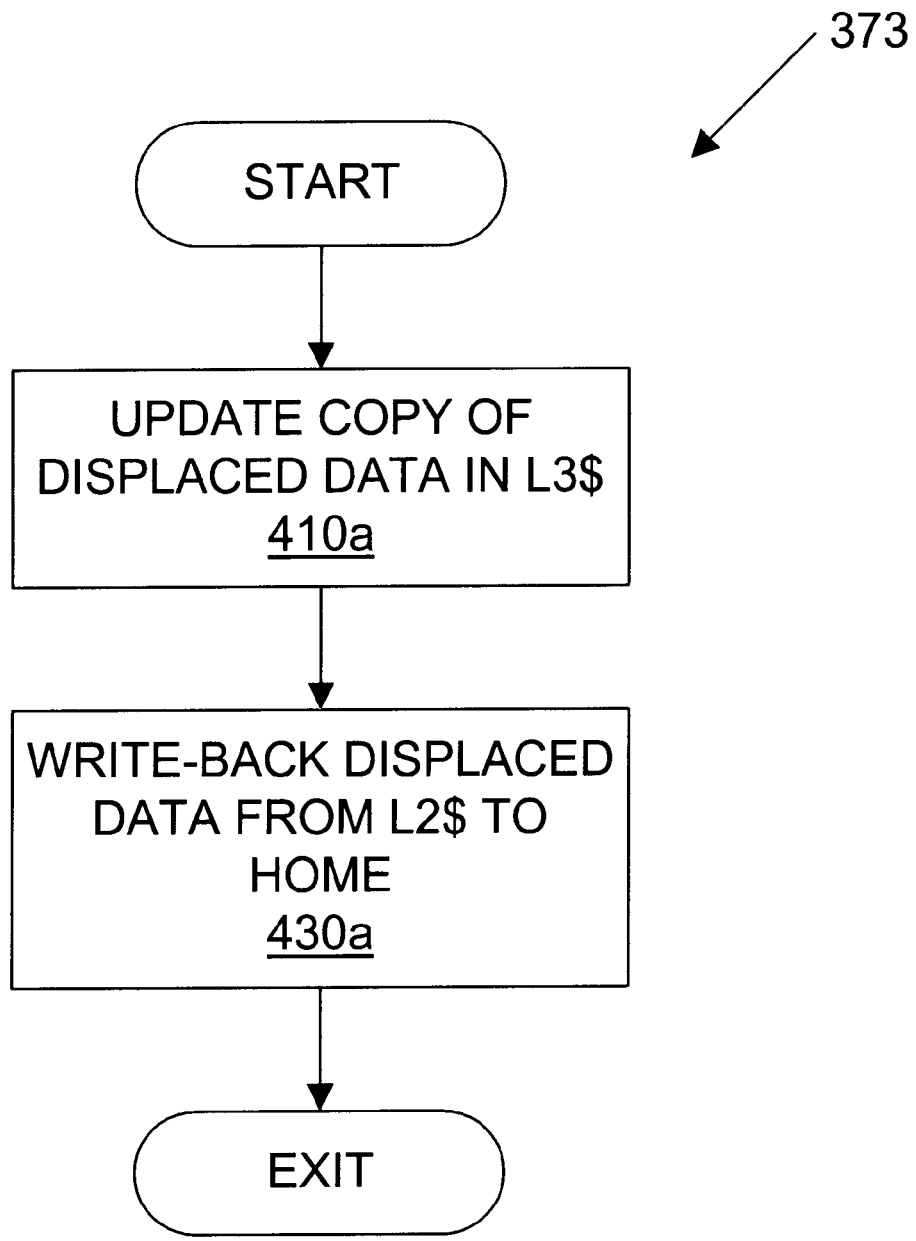
FIG. 4A–4C are flowcharts depicting three exemplary methods of writing back displaced data in a higher-level write-through cache in accordance with the invention.
Figure 4B:
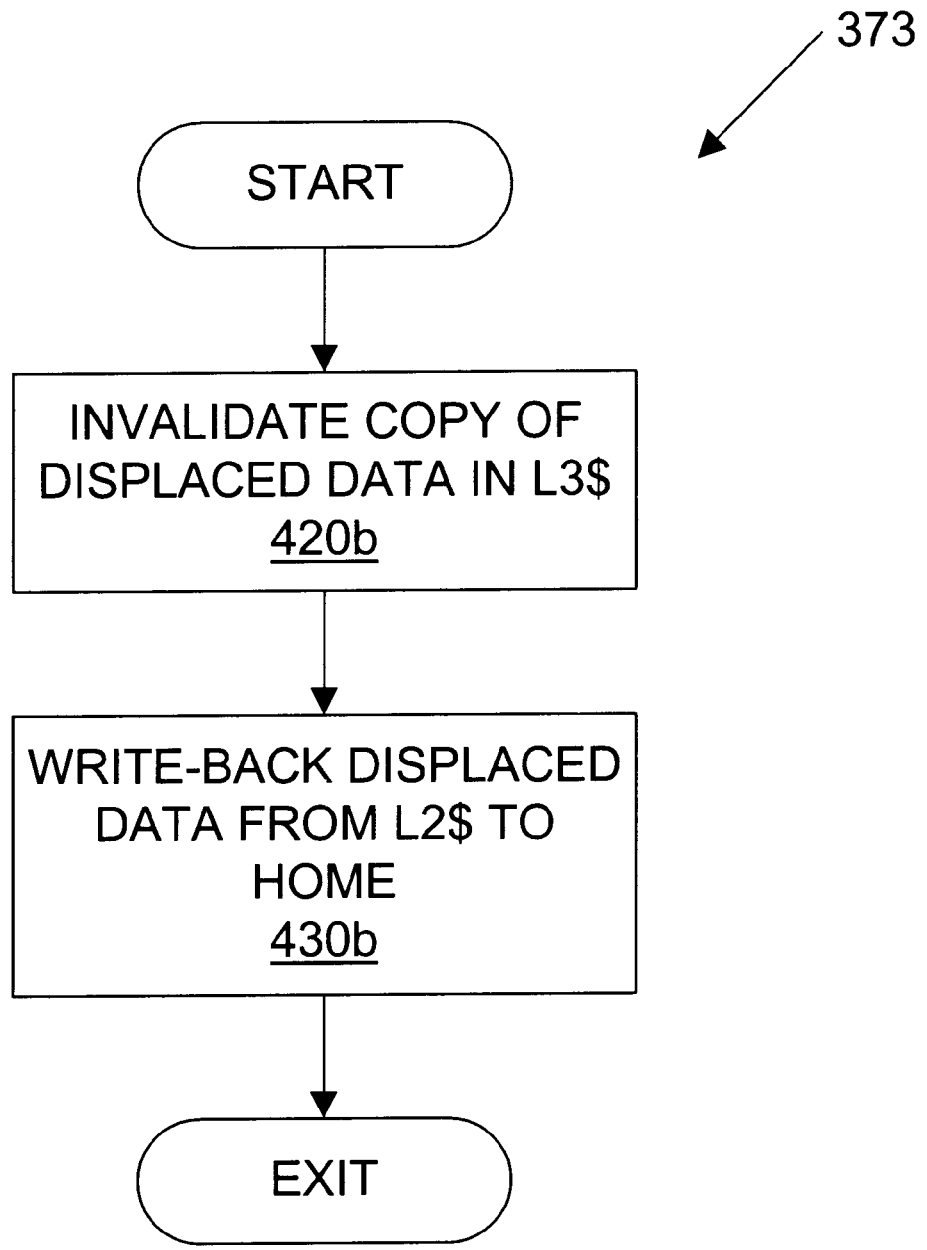
Figure 4C:
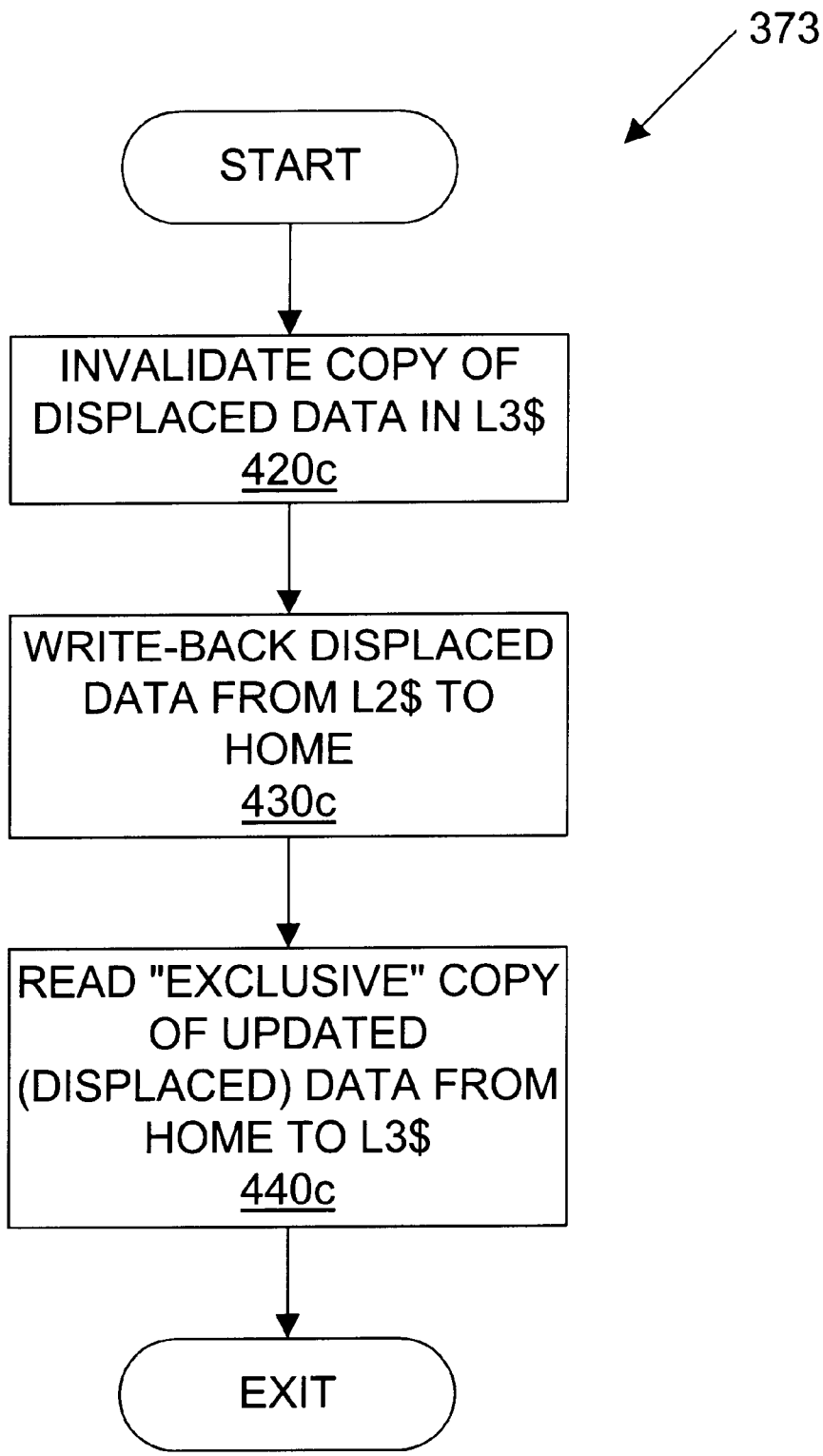

FIGS. 4A, 4B and 4C show three exemplary ways of writing-back dirty copies of data from copy-back L2$ 113a to home subsystem 120, while maintaining L3$ 118 as a write-through cache. In FIG. 4A, each time L2$ 113a writes back dirty data to home subsystem 120, any existing copy in L3$ 118 is also updated (steps 410a and 430a). Alternatively, as shown in FIG. 4B, when L2$ 113a writes back dirty data to home subsystem 120, any existing copy in L3$ 118 is invalidated (steps 420b and 430b).

Finally, as shown in FIG. 4C, when L2$ 113a writes back dirty data to home subsystem 120, any existing copy in L3$ 118 is invalidated (steps 420c and 430c). Next, requesting subsystem 110 sends a read request for an "exclusive" copy of the updated data to home subsystem 120 which can be used to write a new updated copy of the data in L3$ 118 of requesting subsystem (step 440c).

In each of the above three examples, L3$ 118 maintains its write-through characteristics by ensuring that any copy of the data in L3$ 118 is either promptly updated with respect to home subsystem 120 or is promptly invalidated. As a result, L3$ 118 and home subsystem 120 will not have inconsistent copies of the data.

The implementation of a write-through L3$, such as the example described, is unexpectedly efficient for several reasons. Since there is no inclusion imposed on L3$ 118 with respect to the L2$s in each subnode, one skilled in the art can appreciate that because the multi-level inclusion property is not imposed on L3$ 118, the associativity of L3$ 118 can be smaller than the sum of the associativity of underlying L2$s 113a, 113b . . . 113i. Further, since L3$ 118 does not contain dirty data, newer data can simply overwrite old data (simply discard old data) and their corresponding address(es), thereby avoiding an otherwise involved write-back procedure for cache replacements of dirty data. In addition, the address tag associated with L3$ 118 will be either read or written for each transaction on local interconnect 119, but never both, as described in the following exemplary manner for a direct-mapped L3$ cache.

For each transaction on anode's local interconnect 119, the L3$ address tag will be processed as follows:

Read-to-share (RTS) request from a local processor, e.g., processor 111a:
  Read the L3$ address tag. If there is a correspondence with the address value asserted on local interconnect 119, signal the "owned" status and supply the data, otherwise it is a cache miss in L3$ 118 and a data request is sent to home node 120.

Read-to-share reissued by global interface 115 in response to a previous L3$ miss:
  Overwrite the existing L3$ address tag with the value corresponding to the address value asserted on local interconnect 119 and store the data in L3$ 118.

Read-to-share transaction sent by global interface 115 in response to a request originating in another node, e.g., subsystem 120:
  The L3$ 118 does nothing.

Write-back from a local processor, e.g., processor 111a:
  Overwrite the existing L3$ address tag with the value corresponding to the address value asserted on local interconnect 119 and store the data in L3$ 118. Send a global write-back message to the home node 120.

Various optimizations of the above described writeback designation are possible without departing from the spirit of the invention. Hence, the scope of the invention should be determined by the following claims.

What is claimed is:

1. A method of replacing data within a computer system having a skip-level cache hierarchy which includes at least a lower-level copy-back cache and a higher-level write-through cache, wherein said data has a home location within said computer system, a dirty copy of said data exists in said lower-level copy-back cache, and a stale copy of said data exists in said home location, the method comprising the steps of:

operating said lower-level copy-back cache and said higher-level write-through cache as a multi-level hybrid cache-only memory architecture/non-uniform memory architecture (COMA/NUMA) cache system;

operating said higher-level write-through cache as a NUMA cache;

maintaining said higher-level cache non-inclusive of said lower-level cache;

determining that said dirty copy of said data of said lower-level cache needs to be replaced;

writing back said dirty copy from said lower-level cache to said home location, thereby updating said stale copy of said data in said home location; and updating or invalidating a stale copy of said data in said higher-level cache if said higher level cache is storing said stale copy of said data, thereby ensuring that any copy of said data remaining in said higher-level cache is consistent with said updated copy of data in the home location.

2. The method of claim 1 further comprising the steps of requesting an exclusive copy of said data from said home location responsive to said invalidating, and storing said exclusive copy into said higher-level cache.

3. The method of claim 1 wherein said need to replace said dirty data is caused by a need to store a copy of new data in said lower-level cache.

4. The method of claim 3 further comprising the steps of:

modifying said copy of said new data; and marking said copy of new data as dirty.

5. The method of claim 3 further comprising the step of storing a copy of said new data in said higher level cache.

6. The method of claim 5 further comprising the step of discarding old data from said higher-level cache to create space for storing said copy of said new data.

7. A skip-level cache system for a computer system having a processor, the cache system comprising:

a lower-level copy-back cache coupled to said processor; and a higher-level write-through cache coupled to said lower-level cache, wherein said higher-level write-through cache is non-inclusive of said lower-level copy-back cache, and wherein said skip-level cache system is a multi-level hybrid cache-only memory architecture/non-uniform memory architecture (COMA/NUMA) system having a COMA cache and a NUMA cache, and said NUMA cache functions as said higher-level cache.

8. The skip-level cache system of claim 7 wherein said higher-level write-through cache, upon an initiation by said lower-level copy-back cache of a copy-back of data, is configured to invalidate a copy of said data if said copy of said data is stored in said higher-level write-through cache.

9. The skip-level cache system of claim 8 wherein said higher-level write-through cache is further configured to request an exclusive copy of said data subsequent to said copy-back of said data and responsive to said copy-back of said data.

10. The skip-level cache system of claim 7 wherein said higher-level write-through cache, upon an initiation by said lower-level copy-back cache of a copy-back of data, is configured to update a copy of said data if said copy of said data is stored in said higher-level write-through cache.

11. A computer system with a skip-level cache hierarchy comprising:

a processor;

a lower-level copy-back cache coupled to said processor; and a higher-level write-through cache coupled to said lower-level cache wherein said computer system is a multi-level hybrid cache-only memory architecture/non-uniform memory architecture (COMA/NUMA) computer system having a COMA cache and a NUMA cache, and said NUMA cache functions as said higher-level cache.

12. The computer system of claim 11 wherein said higher-level write-through cache, upon an initiation by said lower-level copy-back cache of a copy-back of data, is configured to invalidate a copy of said data if said copy of said data is stored in said higher-level write-through cache.

13. The computer system of claim 11 wherein said higher-level write-through cache, upon an initiation by said lower-level copy-back cache of a copy-back of data, is configured to update a copy of said data if said copy of said data is stored in said higher-level write-through cache.

14. The computer system of claim 11 wherein said higher-level write-through cache is non-inclusive of said lower-level copy-back cache.

15. The computer system of claim 14 wherein said processor includes an internal cache, and wherein said lower-level copy-back cache is inclusive of said internal cache.

* * * * *